Oct. 19, 1965     T. A. DEPREZ ETAL     3,212,363
INDEX MECHANISM

Filed Dec. 26, 1961     2 Sheets-Sheet 1

INVENTORS
THOMAS A. DEPREZ
LOUIS HECK
BY
Richard W. Treverton
ATTORNEY

United States Patent Office 3,212,363
Patented Oct. 19, 1965

3,212,363
INDEX MECHANISM
Thomas A. Deprez, Rochester, and Louis Heck, Penfield, N.Y., assignors to The Gleason Works, Rochester, N.Y., a corporation of New York
Filed Dec. 26, 1961, Ser. No. 162,044
8 Claims. (Cl. 74—822)

The present invention relates to a machine tool index mechanism of the general type disclosed in co-pending application Serial No. 63,412, filed October 18, 1960, wherein a notched index plate is continuously subject to control by either a holding pawl or an indexing pawl.

An object of the invention is a mechanism of this type wherein the indexing angle can be readily adjusted through a larger range than before. Another object is such a mechanism of great simplicity and rugged construction, capable of rapid indexing with high precision.

A mechanism according to the invention comprises a housing in which a notched index plate is rotatable, a locking pawl supported by the housing for movement to engage or disengage a notch of the plate, an indexing pawl arranged for movement to engage or disengage a notch of the plate and also for angular motion in the housing back and forth about the axis of rotation of the plate, a member reciprocable in the housing along said axis and adapted on its stroke in one direction to effect disengagement of the locking pawl and engagement of the indexing pawl, and on its stroke in the opposite direction to effect engagement of the locking pawl and disengagement of the indexing pawl, and means for causing successive strokes of the angular motion about said axis to alternate with successive strokes of the reciprocation along said axis.

A preferred embodiment of the invention is shown in the accompanying drawings, wherein.

Figures 1, 4, 5:
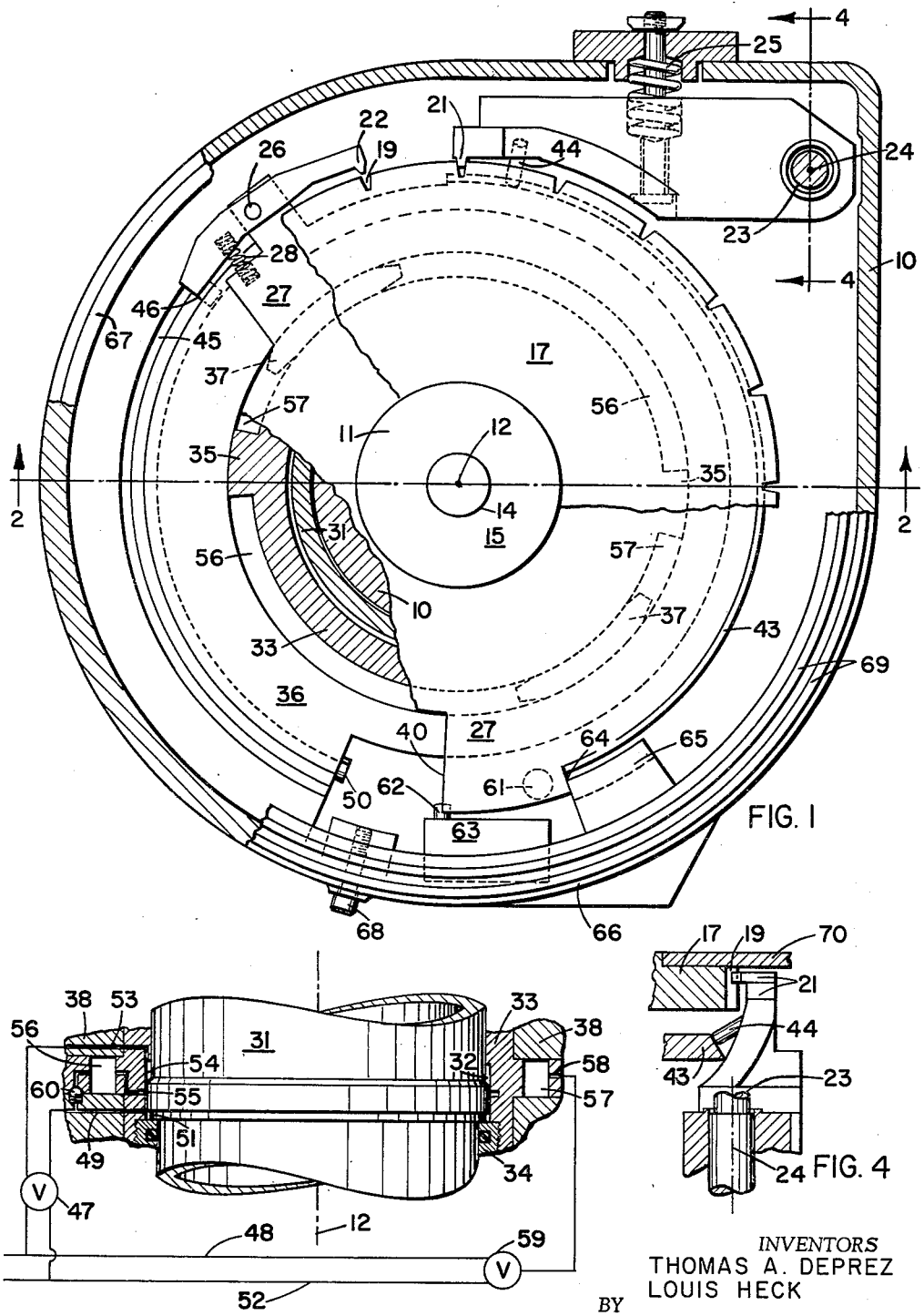
FIG. 1 is a plan view, partly in section in the planes designated by section line 1—1 in FIG. 2.
FIG. 4 is a fragmentary view in the plane designated 4—4 in FIG. 1, showing the indexing plate, the locking pawl and its disengaging means; and, FIG. 5 is a fragmetary vertical sectional view showing, partially in schematic form, hydraulic passages in the mechanism and control valves therefor.

The particular mechanism illustrated, which forms a part of a cutter sharpening machine, comprises a multipart spindle housing 10 in which a spindle 11 is mounted for rotation about upright axis 12 on vertically spaced ball bearings 13, of which only the upper one is shown. The upper end of the spindle 11 is provided with a center 14 and a seating face 15 for a cutter to be sharpened on the machine. The housing 10 is mounted adjustably in a support 16, which however constitutes no part of the present invention.

An index plate 17 is detachably secured to the spindle by screws, one of which is shown at 18, the plate having on its periphery a plurality of equally spaced notches 19, adapted to be engaged by both a locking pawl 21 and an indexing pawl 22. The locking pawl is pivoted by a pin 23, whose axis is 24, to engage or disengage a notch of the plate, and is constantly urged toward engaged position by a spring 25 arranged to act between the pawl and the housing. A pin 26 carried by a member 27 supports the indexing pawl for pivotal motion between engaged and disengaged relation with an index plate notch 19, and a spring 28 constantly acts between the member and pawl to urge the latter toward engaged position. The pawls 21 and 22 are respectively engageable with the upper and lower ends of the notches so that in one phase of operation both of them may be aligned with the same notch. In this condition the pawl 22 partially underlies pawl 21.

Figure 2:
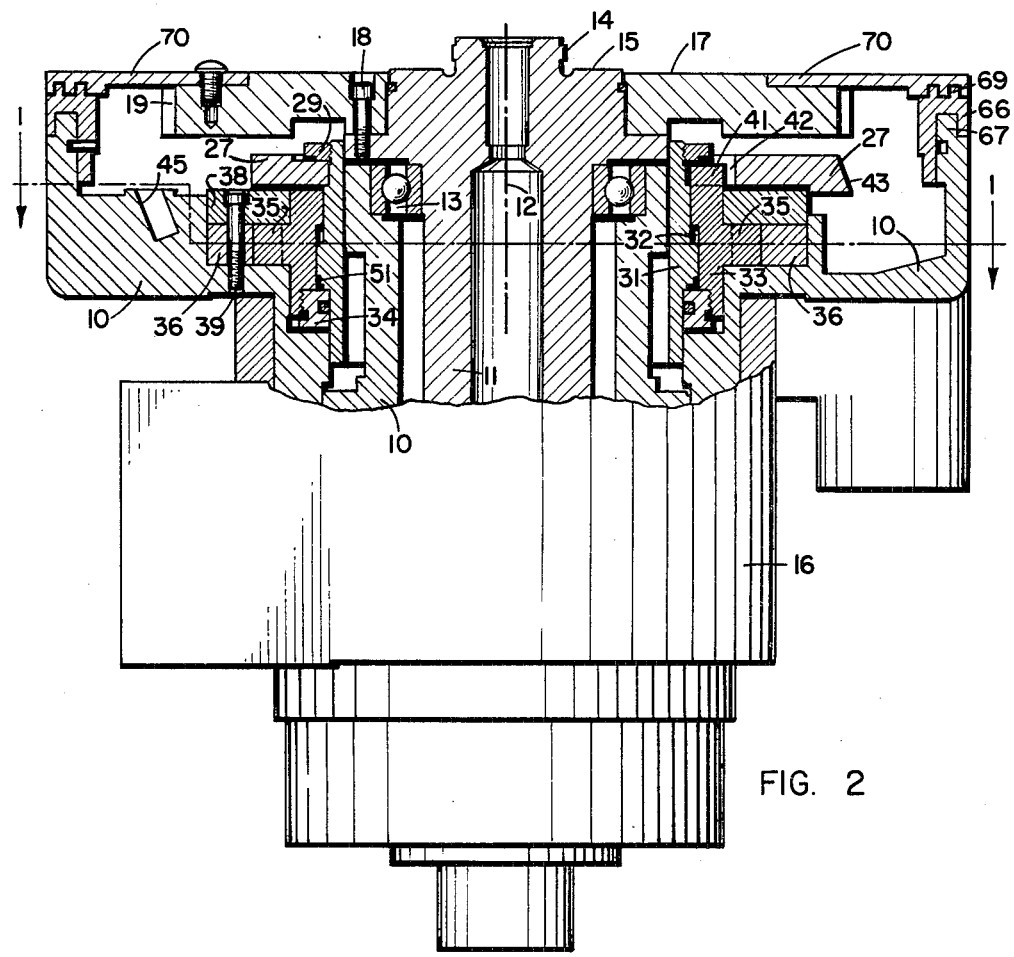
FIG. 2 is a side view, partly in section in the plane designated 2—2 in FIG. 1.
Figure 3:
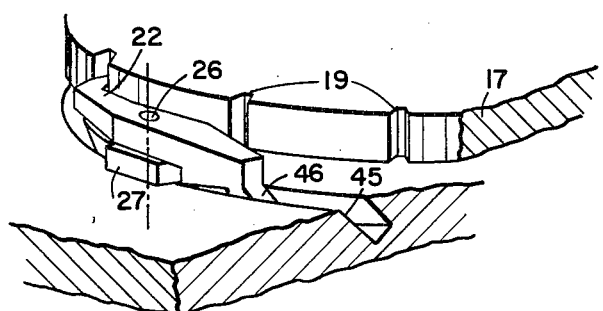
FIG. 3 is a fragmentary perspective of the index plate, the indexing pawl and the disengaging means therefor.

Member 27 is secured by means of a nut 29 to the upper end of a piston 31 which is reciprocable in a cylinder 32 formed coaxially of spindle axis 12 in an annular member 33. The lower head of the cylinder is a ring 34 screw-threaded to member 33. This member has diametrically opposed integral vanes 35 and constitutes the rotor or vane piston of a fluid motor whose stator comprises a ring 36 which carries diametrically opposed stator vanes 37, a ring 38 in which the rotor is journaled for angular motion about axis 12, and the adjacent portion of housing 10. By means of screws 39, one of which appears in FIG. 2, the rings 36 and 38 are secured to and made a part of the housing 10. An integral key 41 on the upper end of rotor member 33 engages in a keyway 42 in member 27.

Member 27 has a conical cam surface 43 engageable with a cam follower pin 44 on pawl 21, the arrangement being such that upon upward motion of member 27 by piston 31 the surface 43 by cam action against the follower pin moves the pawl clockwise in FIG. 1 about its pivot axis 24 to disengage it from the index plate notch 19 in which it is then seated; and upon downward motion of member 27 caused by the piston the cam permits re-engagement of the pawl under the pressure of spring 25. To enable these actions to occur in any of the various angular positions of rotor 33 and member 27 about axis 12, the surface 43 is formed as a surface of revolution coaxial of axis 12.

Similarly the housing 10 has a groove providing a conical cam surface 45 for engagement with tail 46 of pawl 22, this cam surface also being a surface of revolution about axis 12. The arrangement is such that upon downward movement of the piston 31, the member 27 and the pawl 22, the latter is cammed about the axis of its pivot pin 26 out of engagement with an index plate notch 19, while upon upward movement is permitted to be reengaged by action of spring 28. Thus pawl 22 is disengaged simultaneously with engagement of pawl 21, and is engaged simultaneously with disengagement of pawl 21, so that the index plate is at all times subject to the control of one or the other of the pawls.

Referring primarily to FIG. 5, the index mechanism is operated by causing a solenoid valve 47 to admit fluid under pressure, preferably hydraulic fluid, from a pressure line 48 to a passage 49 which extends into chamber 51 beneath piston 31, and to simultaneously connect to exhaust line 52 a passage 53 which opens into chamber 54 above the piston. The applied pressure elevates the piston, disengaging the locking pawl 21 and engaging the indexing pawl 22. As the piston approaches its upper limit position it uncovers ports 55 leading to vane motor chambers 56, whereupon fluid pressure acts against vanes 35 to move the assembly comprising the rotor 33, the member 27, the pawl 22 and the index plate 17, clockwise in FIG. 1 to a limit position wherein the index plate notch 19 engaged by pawl 22 is aligned with pawl 21. This limit position is determined by engagement of a shoulder 40 on member 27 with a stop button 50 which is provided on ring member 36 and therefore constitutes a stationary abutment on the housing. During this clockwise motion of rotor 33 fluid exhaust from vane motor chambers 57 through passages 58 which are connected by a solenoid valve 59 to exhaust line 52. Although in FIG. 5 the several passages are shown extending to only one chamber 56 and one chamber 57, it will be understood that they in fact extend to both chambers of each pair, i.e. that they in effect interconnect the opposed chambers 56 and also interconnect the opposed chambers 57.

As the clockwise limit position of rotor 33 is reached, a roller 61 on member 27 contacts actuating stem 62 of a limit switch 63, causing the latter to reverse solenoid valve 47, thus applying pressure through passage 53 to chamber 54 and connecting chamber 51 to exhaust line 52 through passage 49, which causes piston 31 to move downwardly. This action disengages pawl 22 from the notch 19 which it has delivered into alignment with pawl 21 and engages pawl 21 in this same notch. The switch 63 simultaneously causes cutter sharpening operation of the machine to commence, which, through a suitable means (not shown) causes the solenoid valve 59 to reverse with a delay such that the down-stroke of piston 31 has first been completed. As a result, pressure from line 48 is applied through passages 58 to vane motor chambers 57, causing counterclockwise motion (in FIG. 1) of the assembly comprising the rotor 33, the member 27, and the now disengaged pawl 22, to a limit position determined by engagement of a shoulder 64 of member 27 with abutment 65, in a position wherein pawl 22 is aligned for entry into another notch 19 of the index plate, this being the position shown in FIG. 1. During this counterclockwise motion of rotor 33 fluid exhausts from chambers 56 to passage 49 (which now is connected to exhaust line 52), this exhaust from the chambers being permitted by the automatic opening (downwardly) of a spring-held ball check valve 60. The indexing cycle is now completed with this counterclockwise return motion of index pawl 22. The cycle is repeated by a reversal of valves 47 and 59 which occurs at the conclusion of each sharpening cycle of the machine, to connect passage 49 to pressure line 48 and to connect passages 53 and 58 to exhaust line 52.

The abutment 65 is formed on a ring 66 which may be adjusted by hand around the circular rim 67 of housing 10, which, as shown, is concentric with spindle axis 12. After such adjustment the ring 66 is clamped to the rim by a clamp actuated by screw 68. By simply making this one adjustment, the mechanism is adapted for indexing through any angle within its range, to thereby adapt the machine for sharpening cutters having different blade-to-blade spacing. The maximum indexing angle for the particular mechanism shown is 120°, which can be obtained when an index plate 17 is installed which has a number of notches that is a multiple of three. Interchangeable index plates with different numbers of notches are preferably provided. The one illustrated has twenty notches, which makes possible indexing through an angle of 18°, or any multiple thereof to and including 108°, by different adjustments of ring 66. Interchange of index plates, when necessary, is easily effected by removing screws 18. The upper surface of ring 66 is provided with ridges 69 which register with like ridges on a cover plate 70 detachably secured to the index plate, to provide a labyrinth seal for the protection of the interior of the mechanism.

Having now described the preferred embodiment of the invention, and its mode of operation, what is claimed is

1. An index mechanism for a machine tool comprising a housing in which a notched index plate is rotatable, a locking pawl supported by the housing for movement to engage or disengage a notch of the plate, an indexing pawl arranged for movement to engage or disengage a notch of the plate and also for angular motion in the housing back and forth about the axis of rotation of the plate, a member reciprocable in the housing along said axis and so operably related to said pawls as to effect, on it stroke in one direction, disengagement of the locking pawl and engagement of the indexing pawl, and on its stroke in the opposite direction to effect engagement of the locking pawl and disengagement of the indexing pawl, and actuating means for said pawl and said member arranged to cause successive strokes of the angular motion of said indexing pawl about said axis to alternate with successive strokes of the reciprocation of said member along said axis.

2. A mechanism according to claim 1 in which said means comprise a fluid pressure operable vane piston rotatable back and forth about said axis in unison with the indexing pawl and a fluid pressure operable piston coaxial with said axis and movable therealong in unison with said reciprocable member.

3. A mechanism according to claim 1 in which there is a spring for each pawl to effect said engagement thereof and a cam for effecting said disengagement thereof, the cam surfaces which contact the pawls being surfaces of revolution about said axis and being effective to cam the pawls from engagement with the index plate by and upon reciprocation of said reciprocable member.

4. A mechanism according to claim 3 in which the cam surface for disengaging the locking pawl is on said reciprocable member, the index pawl is carried by the reciprocable member for motion therewith along the axis of the index plate, and the cam surface for disengaging the index pawl is on the housing.

5. A mechanism according to claim 1 having a fixed abutment on the housing to stop the angular motion of the indexing pawl about the axis of the index plate in one direction in a position in which it is aligned with the same notch of the tooth plate as the locking pawl, and an adjustable abutment on the housing to stop the angular motion of the indexing pawl in the opposite direction.

6. A mechanism according to claim 2 in which said means further comprises a port which is uncovered by the axially movable piston at the end of its stroke in the direction in which the indexing pawl is engaged, said port extending from the chamber in which fluid pressure is then being exerted on the axially movable piston to the chamber in which fluid pressure is applied to the vane piston to cause the index plate advancing stroke of said vane piston, whereby such index plate advancing stroke may occur immediately upon engagement of the indexing pawl.

7. A mechanism according to claim 6 in which there is a fluid passage extending between said chamber and which is provided with a check valve which allows exhaust from the chamber for the vane piston during the return stroke of said vane piston when said port is closed by the axially movable piston.

8. A mechanism for indexing a spindle of a machine tool comprising a housing journaling the spindle for rotation, a notched index plate detachably secured to the spindle, a locking pawl pivoted to the housing, a spring for urging the locking pawl into engagement with a notch of the plate, a fluid pressure operable piston coaxial with the spindle and reciprocable in the housing along the spindle axis, a cam member movable in unison with the piston and having a cam surface which is a surface of revolution coaxial of the spindle and is engageable with the locking pawl to disengage the latter from the index plate upon motion with the piston in one direction, an indexing pawl pivoted to the cam member for movement therewith axially of the spindle, a spring for urging said indexing pawl into engagement with a notch of the plate, a cam surface on the housing which is also a surface of revolution coaxial of the spindle and is engageable with the indexing pawl to disengage the latter from the index plate upon motion with the piston in the direction opposite to said one direction, a fluid pressure operable vane piston movable back and forth in the housing about the spindle axis and connected to the cam member for moving the latter angularly in unison therewith, a fixed abutment on the housing to stop angular motion in one direction of the vane piston and cam member in a position in which the indexing pawl is aligned with the same notch of the index plate as the locking pawl, and adjustable abutment on the housing to limit the angular motion of the vane piston and cam member in the direction opposite to said angular motion in one direction, and control valve means for controlling application of fluid pressure to said pistons to cause each stroke of each piston to occur between successive strokes of the other piston.

References Cited by the Examiner

UNITED STATES PATENTS

| | | | |
|---|---|---|---|
| 912,124 | 2/09 | Hanson | 74—822 |
| 2,660,895 | 12/53 | Waters | 74—822 X |
| 2,848,909 | 8/58 | Hill | 74—822 |
| 2,883,886 | 4/59 | Benjamin | 74—822 X |
| 2,893,057 | 7/59 | Rekettye | 74—142 X |
| 2,905,029 | 9/59 | Gustafson | 74—822 X |
| 2,968,973 | 1/61 | Mead | 74—822 |
| 3,030,826 | 4/62 | Hediger | 74—822 |
| 3,111,044 | 11/63 | Diener | 74—142 X |
| 3,120,134 | 2/64 | Sweeney | 74—823 |

BROUGHTON G. DURHAM, *Primary Examiner.*